United States Patent
Thomas et al.

(10) Patent No.: US 10,769,286 B2
(45) Date of Patent: Sep. 8, 2020

(54) NON-INTRUSIVE DATA AUTHENTICATION SYSTEMS AND METHODS

(71) Applicant: National Technology & Engineering Solutions of Sandia, LLC, Albuquerque, NM (US)

(72) Inventors: Maikael A. Thomas, Albuquerque, NM (US); Ross W. Hymel, Albuquerque, NM (US); George T. Baldwin, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 260 days.

(21) Appl. No.: 15/813,427

(22) Filed: Nov. 15, 2017

(65) Prior Publication Data

US 2018/0204014 A1 Jul. 19, 2018

Related U.S. Application Data

(60) Provisional application No. 62/423,714, filed on Nov. 17, 2016.

(51) Int. Cl.

| H04L 9/32 | (2006.01) |
|---|---|
| G06F 21/60 | (2013.01) |
| G06F 21/82 | (2013.01) |
| G06F 21/86 | (2013.01) |
| G09C 1/00 | (2006.01) |
| H04L 9/08 | (2006.01) |

(52) U.S. Cl.
CPC .......... *G06F 21/602* (2013.01); *G06F 21/604* (2013.01); *G06F 21/82* (2013.01); *G06F 21/86* (2013.01); *G09C 1/00* (2013.01); *H04L 9/0877* (2013.01); *H04L 9/3234* (2013.01)

(58) Field of Classification Search
CPC ............................. G06F 21/602; G06F 21/604
USPC .......................................................... 726/27
See application file for complete search history.

(56) References Cited

U.S. PATENT DOCUMENTS

| 9,473,300 | B2 | 10/2016 | Coleman et al. | |
|---|---|---|---|---|
| 2005/0076228 | A1 | 4/2005 | Davis et al. | |
| 2005/0138422 | A1* | 6/2005 | Hancock | H04L 9/00 726/4 |
| 2010/0329363 | A1* | 12/2010 | Ng | H04B 3/00 375/257 |
| 2012/0130950 | A1* | 5/2012 | Jain | G06F 16/184 707/634 |
| 2013/0117556 | A1* | 5/2013 | Coleman | H04L 9/0827 713/154 |
| 2015/0180760 | A1 | 6/2015 | Rickard | |

OTHER PUBLICATIONS

PCT International Search Report dated Aug. 24, 2018 for PCT/US2017/061808.

* cited by examiner

*Primary Examiner* — Michael S McNally
(74) *Attorney, Agent, or Firm* — Daniel J. Jenkins (57) ABSTRACT

Systems and methods are disclosed that create a separate digital and cryptographically secure signal "branch" to a secondary observer from a primary signal path of an information system. The information system may be a measurement system. The secure signal branch is creating without interfering with the primary signal path. In such a manner, the secondary observer may authenticate reported data while not interfering with the signal of the information system.

57 Claims, 7 Drawing Sheets

NON-INTRUSIVE DATA AUTHENTICATION SYSTEMS AND METHODS

CROSS-REFERENCE TO RELATED APPLICATIONS

This application claims benefit of U.S. Provisional Patent Application No. 62/423,714, "NON-INTRUSIVE DATA AUTHENTICATION SYSTEM AND METHODS", filed Nov. 17, 2016, the disclose of which is incorporated by reference herein in its entirety.

STATEMENT OF GOVERNMENT INTEREST

The United States Government has rights in this invention pursuant to Contract No. DE-AC04-94AL85000 between the United States Department of Energy and Sandia Corporation, and Contract No. DE-NA0003525 between the United State Department of Energy and National Technology & Engineering Solutions of Sandia, LLC, for the operation of the Sandia National Laboratories.

FIELD

The present disclosure is generally directed to systems and methods that non-intrusively monitor and/or cryptographically secure information system data and is more particularly directed to systems and methods that non-intrusively monitor and/or secure data for authentication.

BACKGROUND

Information systems may be monitored for compliance or security reasons. Often, it may be desirable to monitor without tampering with or providing notice to the primary user or owner of the system of the monitoring. For example, data may be collected by a primary observer and used by the observer to report compliance of one or more parameters measured by one or more measurement systems. At times, it may be necessary for an independent party, or secondary observer, to non-intrusively, securely, and independently monitor and authenticate that same data.

A need remains for systems and methods that non-intrusively and securely monitor data, such as data from an information system, without interfering with the data transmission or informing the data system owner of the monitoring activity. The information system may be sensor data collection information system.

SUMMARY OF THE DISCLOSURE

The present disclosure is directed to information or data monitoring systems and methods that securely and non-intrusively monitors an information system's transmitted data or source data by branching a data transmission and providing a cryptographically secure copy to a secondary observer. The data monitoring systems and methods may be referred to as Enhanced Data Authentication Systems (EDAS) and Methods (EDAM), collectively referred to as EDAS. As used in this disclosure for branched applications, the terms "non-intrusive" and "non-intrusively" mean that the data transmission between the information system and the primary observer is not interfered with or manipulated so that the main data transmission is unaffected. As used in this disclosure for non-branched applications, the terms non-intrusive" and "non-intrusively" mean that the source data is copied without manipulation of or interfering with the source data. As used herein, the term "manipulation" or "interfering" means that the source data cannot be changed in any way by means of deletion, insertion, or modification. The phrase "information or data," or "original information system data," will be collectively referred to as "data" and is meant to include any data output from a sensor, system, or computer, whether analog or digital, that is intended to be transmitted to another location. The information system may be an existing measurement system (e.g., industrial scale or radiation detection system), transaction-based systems (e.g., monitoring banking transactions or stock trades), intelligence gathering systems (e.g., intercepted communication streams), and others.

The present disclosure is further directed to data encryption and cryptographic authentication systems and methods that cryptographically secure data from an unsecured or secure information system such as, but not limited to, a monitoring or measurement system (e.g., to protect unsecured legacy instrumentation data in a nuclear facility.

According to an embodiment of the disclosure, a system is disclosed that includes a junction box and a secondary observer system connected to the junction box. The junction box includes a data input connection for receiving data from an information system, a data output connection for transmitting information system data to a primary observer, and a secondary data output connection for transmitting copied data to a secondary observer. The junction box further includes hardware, firmware, and software that monitors and copies data received in the data input connection to form the copied data, cryptographically secures the copied data, and securely transmits the copied data from the secondary data output connection to a communications branch that connects the junction box to the secondary observer. The data is copied without accidental or intentional manipulation of the information system data received at the data input connection and transmitted to the primary observer via the data output connection.

According to another embodiment of the disclosure, a system is disclosed that includes a junction box and an observer system connected to the junction box. The junction box includes a data input connection for receiving data from an information system and a data output connection for transmitting a secure copy of the information system data to an observer. The junction box further includes hardware, firmware, and software that monitors, copies, and secures the data and transmits the secure copy of the information system data to the observer system via the data output connection. The information system data is copied without accidental or intentional manipulation of information system data in forming the secure copy of the information system data.

According to another embodiment of the disclosure, a method is disclosed that includes creating a branched data stream from a data stream being provided to a primary observer without accidental or intentional manipulation of the data stream data, the data stream communicating data and the branched data stream communicating a copy of the data, and transmitting a cryptographically secure copy of the data monitored on the data stream to a secondary observer system.

According to another embodiment of the disclosure, a method is disclosed that includes creating a cryptographically secure data stream from a source data stream without accidental or intentional manipulation of source data stream data, and transmitting the cryptographically secure data stream to an observer.

An advantage of the present disclosure is that a source data stream can be monitored by a secondary observer without knowledge of the primary observer, even in the case of disclosure failure.

Another advantage of the present disclosure is that the disclosed systems and method do not permit accidental or intentional manipulation of the primary sensor/observer communication path data.

Another advantage of the present disclosure is that it provides a standards-based method to monitor data streams.

Another advantage of the present disclosure is that sensor and measurement system data, possibly from legacy instrumentation, can be securely monitored (cryptographically) without interfering with the sensor data stream.

Another advantage of the present disclosure is that unsecured data streams from legacy instrumentation in operational facilities can be cryptographically secured, especially where that legacy instrumentation cannot be replaced or modified without great expense.

Another advantage of the present disclosure is that the disclosed systems and method can be directly integrated with any sensor, creating independent, cryptographically secure data channels to allow for direct monitoring of the sensor by multiple parties.

Other features and advantages of the present disclosure will be apparent from the following more detailed description of the preferred embodiment, taken in conjunction with the accompanying drawings, which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

According to an embodiment of the disclosure, data monitoring systems and methods that securely and non-intrusively monitor an information system's transmitted data are disclosed. In an embodiment, EDAS allows for the monitoring of data, without interference with and/or the knowledge of the information system's owner. EDAS securely and non-intrusively monitors data by branching a data transmission and providing a cryptographically secure copy to a secondary observer. The phrase "information or data" will be collectively referred to as "data" and is meant to include any data output from a sensor, system, or computer, whether analog or digital, that is intended to be transmitted to another location. The information system may be an existing measurement system (e.g., industrial scale or radiation detection system), transaction-based systems (e.g., monitoring banking transactions or stock trades), intelligence gathering systems (e.g., intercepted communication streams), and others. In an embodiment, EDAS may be installed with a facility operator's knowledge to provide inspectors or regulators additional declarations, auditing, context, and redundancy, either during the initial design of the facility or during operations. In another embodiment, EDAS may be installed without the facility operator's knowledge.

EDAS provides for the cryptographically secure monitoring and authentication of data sent over a communication path. In an embodiment, the information system may be a data measurement or monitoring system. The data stream and communication path may be referred to as the main data stream and main communication path, respectively. In an embodiment, EDAS may monitor both the "transmit" and "receive" channels of the main communication path. In another embodiment, EDAS may monitor either the transmit or receive channel. EDAS monitors without interfering with the primary data transmission, as all EDAS functionality is galvanically isolated from the main communication path. From the perspective of a user or the primary observer, the operator of the data system, the data measurement system operates the same whether or not EDAS is present and whether or not EDAS is operating or powered.

In a nuclear safeguards application, EDAS can enable an international nuclear safeguards inspectorate to monitor process-related data, such as sensor output, from instrumentation belonging to a facility operator. In an embodiment, the safeguards inspectorate may be an international nuclear safeguards inspectorate and the facility operator may be a nuclear facility operator. In an embodiment, EDAS may be installed with the full knowledge and consent of the operator, and part of the operator acceptance is knowing that EDAS cannot in any way interfere with the instrumentation output data stream communication path. In such a manner, monitored data may complement information obtained from safeguards inspector measurements that are fully independent from those of the operator, providing additional facility context and redundancy for the safeguards inspector. The monitored data sent to the inspector is cryptographically secure to provide the inspector confidence that the data is authentic for nuclear material accountancy purposes as well as monitoring for evidence of undeclared facility activities. Further, secure monitored data may convey critical information that would cause financial or regulatory harm to the facility operator should the data be corrupted, manipulated, or viewed by a competitor.

In various other embodiments, EDAS may be used in applications such as, but not limited to:

1) The secure monitoring of the input/output ports of deployed nuclear safeguards equipment owned by the inspector, such as a radiation detector, to detect whether anyone reconfigures or otherwise manipulates the firmware of the instrument.

2) Dual-use of sensors and measurement systems data streams. As an example, two nuclear safeguards inspectorates could each independently monitor facility instrumentation signal lines.

3) To covertly monitor banking transactions, security trades, or suspected criminal communication channels for evidence of illegal activity.

4) Remote monitoring of a sensor or measurement system.

EDAS may be designed into or introduced into an information system to monitor information system data. The information system includes a data transmission source, a data or main communications path and a primary observer system. EDAS allows a secondary observer system to monitor and verify data received by the primary observer from the data transmission source. EDAS creates a digital signal communication branch (EDAS communications branch) through which a copy of the data transmitted over the main communication path is provided to a secondary observer system. The EDAS branch is introduced into the main communication path at a tap-off point in the main communication path between a given data transmission source and its associated primary observer. In an embodiment, the tap-off point may be at the data source, for example integrated into the sensor. In another embodiment, the tap-off point may be along the main communication path.

The data transmission source may be, but is not limited to a sensor, computer, data network, database, social media network or other source of transmitted data. In an embodiment, the sensor is an electronic component, module, or subsystem whose purpose is to detect events or changes in its environment and send the information to other electronics, frequently a computer processor. In an embodiment, the sensor may be found in areas such as physical security, surveillance, safety, safeguards, environmental monitoring, seismic monitoring, finance, or the military. In an embodiment, the sensor may be, but is not limited to a radiation detector, motion detector, an imager, for example, but not limited to a CMOS camera sensor, a thermal detector or imager, a balanced magnetic switch, temperature sensor, voltage sensor, or accelerometer.

In an embodiment, the main communications path is a hardwired communications link, such as, but not limited to RS-232, RS-485, USB, Ethernet, or CAN bus that communicates data from the data source to the primary observer. In another embodiment, the main communication path is a wireless transmission, such as, but not limited to 802.11 Wireless LAN (i.e., Wi-Fi), Bluetooth, or Near-field Communication (NFC).

The primary observer system, which may be referred to generally as the primary observer, receives data from the data source. The primary observer may be a user, computer, data storage device or combinations thereof for receiving and processing data received from the data source. The primary observer may perform functions such as, but not limited to analysis, review, utilize data for control, and store or forward the data to another system.

EDAS includes three main components or systems, an EDAS junction box, an EDAS branch data stream or communication path, and a secondary observer system.

(1) The EDAS Junction Box is embedded or introduced into a communication path of an information system. In an embodiment, the information system may be, but is not limited to, a measurement system between the sensor and primary observer. The communication path may be a main communication path of the information system or any other communication path of interest. In another embodiment, the EDAS junction box can be inserted on the network between one computer sending stored or analyzed data to a second receiving computer. In an embodiment, the information system may be a measurement system. In embodiment, the measurement system is an existing measurement system into which the EDAS junction box is introduced. In another embodiment, the EDAS junction box is initially designed into the data source. For example, the EDAS junction box may be designed into or integrated into a measurement sensor. The EDAS junction box has software that performs one or more functions to packetize, timestamp, digitally sign, encrypt, and transmit the data over an EDAS communications branch to a secondary observer.

EDAS creates a bit-for-bit copy of a primary observer data stream, which it then transmits to the secondary observer system in a cryptographically secure manner. As discussed above, the EDAS junction box senses, copies, and transmits data without interfering with or otherwise manipulating the primary observer's data stream transmission. The EDAS junction box uses galvanic isolation to enable EDAS to monitor the main data stream without interfering with the data transmission, even in the case of failure or loss of power. The secondary observer system receives the copied data from the EDAS junction box via the EDAS communication path for analysis and review.

As discussed above, to ensure that data transmitted on the EDAS branch is confidential, EDAS encrypts the data that is copied from the main communications path and sent to the secondary observer. It will further digitally sign the data packets to ensure they are cryptographically authentic (i.e., the data has not been modified in any way). In an embodiment, the EDAS cryptographic functions may employ secret or public key methodologies. In cryptography, there exist secret key (symmetric key) and public key (asymmetric key) algorithms. With secret key algorithms, the same cryptographic key is used to sign and authenticate the data. So as not to compromise the key, a secure channel must be used to transmit the key to both ends of the communication link. With public key algorithms, a private/public key pair are created. In these algorithms, the private key is used by one party to sign the data, while the public key is used by one or multiple parties to authenticate the data. Since different keys that perform different functions are used at the source and destination of the communication link, key management may be easier than with secret key algorithms.

In an embodiment, some or all of the cryptographic algorithms may be computed by a field programmable gate array (FPGA) chip with custom programming. In another embodiment, the cryptographic operations may be performed by an Application Specific Integrated Circuit (ASIC). In yet another embodiment, cryptographic operations may be performed in software via a publicly-available 3rd party software library.

The EDAS Junction Box includes electronics that provides galvanic isolation between the main communications path and the EDAS junction box processor. The branched data is introduced to the junction box processor through the isolation barrier for further processing. Additionally, the isolation barrier contains diode-like circuits, ensuring no data from the secondary observer side can leak onto the original data stream, assuring non-interference (i.e., data cannot be deleted, modified, or added) with the main communication path. The junction box contains a processor that runs or executes software to packetize, timestamp, digitally sign, encrypt, and transmit the data packets to a secondary observer system over the EDAS communications branch. In other embodiments, EDAS firmware may be embedded into one or more printed circuit boards.

2) An EDAS branch communication path (EDAS Branch) that carries the cryptographically secure copied data transmitted from the EDAS Junction Box to the EDAS secondary observer system. In an embodiment, the EDAS Branch is a hard transmission line (as opposed to a "wireless" communication path) such as, but not limited to Ethernet or USB. In another embodiment, the EDAS Branch is transmitted wirelessly such as, but not limited to IEEE standard 802.11 Wireless LAN (i.e., Wi-Fi).

3) An EDAS secondary observer system, which may generally be referred to as a secondary observer, receives data from the EDAS junction box over the EDAS branch. In effect, the EDAS secondary observer receives an exact copy of the data received by the primary observer without interfering with the information system. The secondary observer may be a user, computer, data storage device or combinations thereof for receiving and processing data received from the EDAS junction box. The secondary observer may perform functions such as, but not limited to analysis and/or data authentication, review, utilize data for control, and store or forward data to another system.

In an embodiment, the secondary observer includes a computer that receives, stores and/or processes data from the EDAS communications branch that originated from the EDAS Junction Box. The computer may be referred to as an EDAS computer. The computer includes a processor, as well as EDAS software that decrypts, authenticates, displays and/or stores the received data. The data may be displayed in real-time or "live" mode to a person or persons (secondary observer). The data may also be presented in raw "as received" form from the EDAS junction box or may be presented in a post-processed format for display, such as would be seen by the primary observer 104. In another embodiment, the secondary observer system may store and/or provide the data in raw or post-processed form to a secondary observer at a later time or at a different location. In an embodiment, EDAS server software processes the data by saving each received data packet, together with pertinent information about that packet, to an ASCII text file. That file can subsequently be used by other post-processing software employed by the secondary observer.

Figure 1:
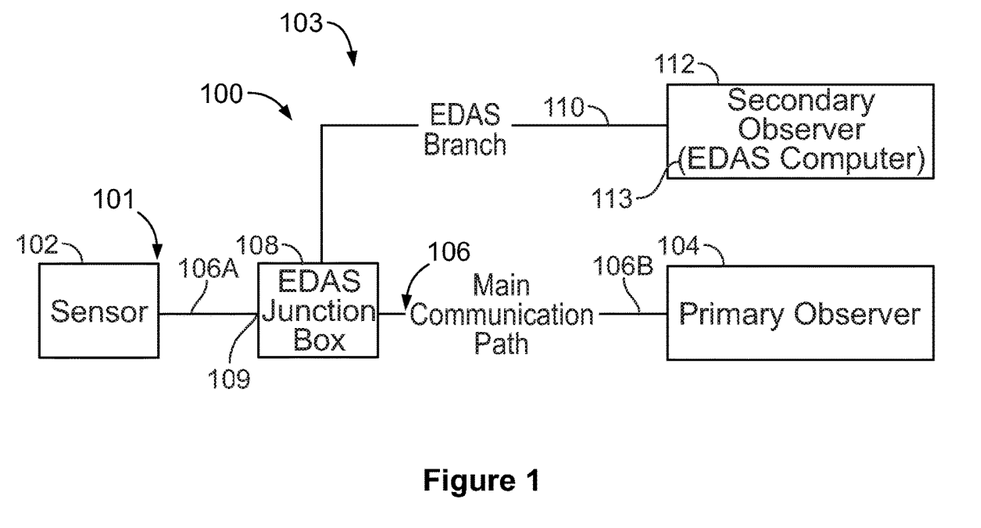
FIG. 1 illustrates a data monitoring system according to an embodiment of the disclosure.

FIG. 1 illustrates an exemplary application of an embodiment of an EDAS system (EDAS) 100 integrated into a data monitoring or measurement system 101. The combined EDAS 100 and information measurement system 101 may be referred to as a monitored measurement system 103. In this exemplary embodiment, EDAS 100 was later introduced into an existing measurement system 101. In another embodiment, EDAS may initially be included in a measurement system. As can be seen in FIG. 1, the data measurement system 101 includes a sensor 102, a primary observer system or primary observer 104 that receives information or data from the data source 102, and a main communications path 106 over which the data is transmitted or communicated from the sensor 102 to the primary observer 104.

In this exemplary embodiment, the sensor 102 is a temperature sensor measuring data representing a physical parameter, temperature. In other embodiments, the sensor 102 may be, but is not limited to a radiation detector, a weight scale, a barcode scanner, code reader, or other process monitoring instrumentation and the data is a parameter of the measurement system. In another embodiment, the sensor may be measuring a parameter such as, but not limited to a radiation detection alert, temperature, weight, identification label or number, pressure, camera images, among others. In another embodiment, the sensor may be, but not limited to a proximity sensor, radiation sensor, temperature sensor, light sensor, or pressure sensor, among others. In other embodiments, the sensor may be a computer, data transmission device or link, a transducer to convert a real-world force into an electrical signal (e.g., pressure sensor), a "human" sensor (e.g., creation of social media content), or other data information source having a transmitted parameter (data). The data may be digital or analog. The data may be referred to as original information system data.

In this exemplary embodiment, the main communications path 106 is a communication link or cable carrying a data signal. In other embodiments, the main communications path 106 may be another class of data transfer link such as, but not limited to, an optical fiber, an infrared data link, or other wireless communication interfaces.

The primary observer may be a user, computer, data storage device or combinations thereof for receiving and processing data received from the data source. The primary observer may perform functions such as, but not limited to analysis, review, utilize data for control, send commands to the data source, and store or forward the data to another system.

In an embodiment, the data source 102 may be part of a nuclear process. In an embodiment, the data source 102 may be, but is not limited to a radiation sensor, temperature sensor, pressure sensor, code reader, or proximity sensor. The main communications path 106 may be a hardwired communications link, such as, but not limited to RS-232, RS-485, USB, Ethernet, or CAN bus. The primary observer 104 may be a nuclear process operator or system.

Referring again to FIG. 1, EDAS 100 includes an EDAS junction box 108 and a secondary observer system, which may be referred to as a secondary observer 112. The EDAS junction box 108 is placed in the main communications path 106 at a tap-off point 109 between a first main communications path portion 106A and a second main communications path portion 106B. In this exemplary embodiment, the EDAS junction box 108 is located proximate to the sensor 102. In another embodiment, the EDAS junction box 108 is located in the main communications path 106. In an embodiment monitoring a measurement system, the EDAS junction box 108 is placed as close to the sensor 102 as practical. In some applications, it may be important to minimize the distance 106A between the authentic source of the data, the sensor 102, and the EDAS junction box 108, so that an adversary has less opportunity to manipulate the data before it is branched. The EDAS junction box 108 creates a cryptographically confidential and authentic copy of the main communication path 106 data, making it very difficult for an adversary to read, add, delete, or manipulate the data on the EDAS branch 110. Remedies, such as tamper indicating cabling or video surveillance, could be applied to the short cable distance 106A between the sensor 102 and EDAS junction box 108 to address adversary data manipulation on the main communication path.

The EDAS junction box 108 senses, branches and replicates data transmitted over the main communications path 106 and sends the replicated data over a communications "branch" (EDAS branch) 110 to the secondary observer 112. The EDAS junction box 108 creates an exact copy of data transmitted over the main communications path 106 and transmits this replicated data over the EDAS branch 110 to the secondary observer 112. The EDAS junction box 108 branches bidirectional data from the main communications path 106 (i.e., data originating from the sensor 102 or flowing to the sensor 102 from primary observer 104). In an embodiment, the EDAS junction box 108 may also time-stamp, digitally sign, and/or encrypt the copied data. As with the main communications path 106, the EDAS branch 110 is a hardwired communications link, such as, but not limited to RS-232, RS-485, Ethernet, USB, or CAN bus.

In an embodiment, coupling (i.e., the branching mechanism) may need to be duplicated for multiple conductors in the main communications path. The coupling can be realized in various ways that may involve use of an isolation transformer, inductive pickoff, capacitive barrier, optical coupling, or similar stand-off mechanism.

In this exemplary embodiment, the secondary observer 112 includes a computer 113 for receiving and processing data received from the EDAS junction box 108. The computer 113 includes a processor and software, which decrypts, authenticates, displays and/or stores the received data. The data may be displayed in real-time or "live" mode to a person or persons (user(s)). The data may also be presented in raw "as received" form from the EDAS junction box 108 or may be presented in a post-processed format for display, such as would be seen by the primary observer 104. In another embodiment, the secondary observer 112 may store and/or provide the data in raw or post-processed form to a secondary observer at a later time or at a different location. In an embodiment, EDAS server software processes the data by saving each data packet, together with pertinent information about that packet, to an ASCII text file. That file can subsequently be used by other post-processing software employed by the secondary observer 112.

Figure 2:
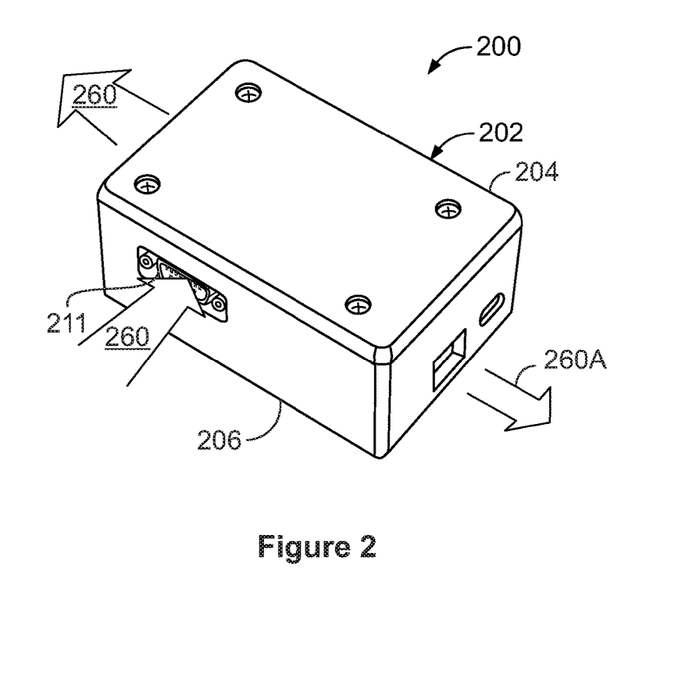
FIG. 2 shows an EDAS junction box according to an embodiment of the disclosure.
Figure 3:
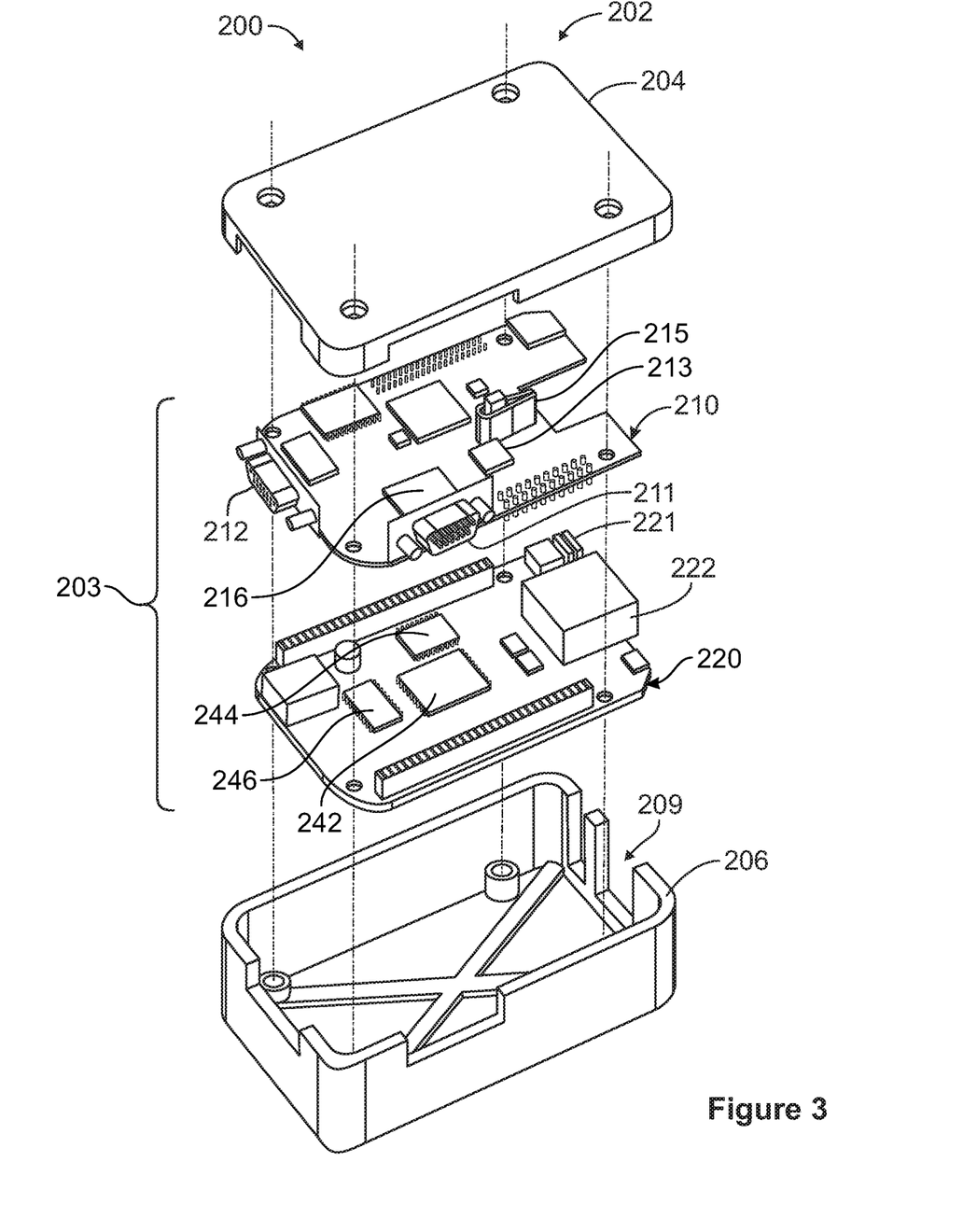
FIG. 3 shows an exploded view of the EDAS junction box of FIG. 2 with the fasteners removed for clarity.

FIGS. 2 and 3 show an EDAS junction box 200 according to an embodiment of the disclosure. The EDAS junction box 200 receives data 260 from a main communications path 106 (see FIG. 1) at a first serial connector 211 and re-introduces that data 260 back into the main communications path 106 at a second serial connector 212 without interference. EDAS branch data 260A, which includes data 260 along with junction box-appended metadata (e.g. packetized, time-stamped, encrypted, digitally signed), is transferred at an EDAS branch connector 222 to the EDAS Branch 110.

The EDAS junction box 200 includes a housing 202 and an electronics package 203. The electronics package 203 includes an EDAS circuit board or cape 210 and a processor board 220. The housing 202 includes a top portion 204 and a bottom portion 206. In this exemplary embodiment, the top portion 202 is attached or joined to the bottom portion 204 by fasteners (not shown) that further secure the cape 210 and processor board 220 within the housing 202. In this exemplary embodiment, the fasteners are screws. In other embodiments, the fasteners may be screws, bolt clips or other joining devices. In yet other embodiments, the top and bottom portions 202, 204 may be joined without the use of fasteners, such as by, but not limited to the use of glues, welding, brazing, or other joining techniques.

The EDAS Junction Box needs to be powered for it to generate a branched signal to the secondary observer. If the EDAS Junction Box is not powered, or power should be lost, the main communication path still operates normally. This uninterrupted operation occurs because the Junction Box passively senses the data flow on the main communication path, in a non-interfering manner, to provide the data branching function. Thus, the primary signal path remains unaffected whether the Junction Box is powered or not.

The cape 210 provides galvanic isolation between the main communications path and the EDAS communications branch, while securely branching the main communications path data to the secondary observer. In this exemplary embodiment, the main communications path connects to the junction box 200 via standardized DB-9 serial connectors. The cape 210 links the primary instrumentation signal path between the main communication path signal input and output connectors (input and output connectors) 211, 212 yet includes isolated sensing electronics (see discussion of isolated data unit 224 below) to generate a copy of the signal.

In this exemplary embodiment, the input and output connectors 211, 212 are DB-9 connectors. In other embodiments, the input and output connectors 211, 212 may be other types of cable link connectors, such as, but not limited to coaxial, DB-25, USB, Ethernet, or DIN connectors. In yet other embodiments, the input and output connectors 211, 212 may be as appropriate for other signal carrier types, such as, but not limited to fiber optic connections.

In this exemplary embodiment, the input and output DB-9 connectors on the cape 210 use different genders, allowing the EDAS junction box to be directly inserted into the main communication path without the need for custom cabling. In an embodiment, the information system main communication path 106 may have connectors in the main communication path 106 that allow for an EDAS junction box 200 with the appropriate mating connectors to be inserted into the main communication path by simply plugging the EDAS junction box 200 into the main communications path 106. In other embodiments, the EDAS junction box 200 may be inserted by adding connectors to or splicing into the main communication path. In this exemplary embodiment, the primary instrumentation signal is assumed to use either the RS-232 or RS-485 protocol. In other embodiments, the cape 210 may be hardwired into the main communication path or the connectors may be of different types that accommodate insertion into the main communication path based on the path hardware.

The cape 210 further includes electronics that enforce data directionality when sensing and branching the main communication path. These electronics are akin to a one-way valve, permitting data to flow from the main communication path through the EDAS Junction box isolation components but not in the reverse direction. Such an arrangement precludes the Junction Box from impressing a signal onto the main communication path even if the Junction Box were to malfunction or lose power.

As can be seen in FIG. 3, the cape 210 includes a mechanical tamper detection unit 213, a battery backup unit 215 and a crypto co-processor 216. The mechanical tamper detection unit 213 monitors junction box over/under temperature, over/under voltage, and up to 4 physical tamper inputs. In such a manner, the keys used to digitally sign and encrypt information for the secured branch may be physically protected. Excursions beyond configured temperature or voltage thresholds signify a tamper event 213 also monitors two mechanical switches for tamper detection. When the housing 202 is shut, one switch is normally open and rests inside a scalloped actuator, while the other switch is normally closed and is depressed by the same actuator. Any change in state of either switch signifies a tamper event. In an embodiment, the mechanical tamper detection unit 213 may be omitted.

On detection of a tamper, the hardware automatically powers down, destroying all sensitive cryptographic keys that are stored in volatile memory of the crypto co-processor 216. An embodiment may use a power-down circuit, which is an all-analog circuit that grounds the power connections of any component containing a key. No processor intervention is required, enabling the key destruction to take place very quickly (e.g., approximately 50 µs). In another embodiment, the mechanical tamper detection unit 213 may be optional.

The battery backup unit 215 provides power to retain cryptographic keys and time information while main power is off. Maintaining accurate time is important since data packets sent on the EDAS branch are timestamped, providing an essential dimension to post-processing analysis of branched data. EDAS is designed to recover automatically to normal operation once power is restored. In other embodiments, the battery backup unit 215 may be omitted.

The crypto co-processor 216 is dedicated hardware which implements the Elliptic Curve Digital Signature Algorithm (ECDSA) for digitally signing and verifying branched packets. The public key cryptography uses the K-233 elliptic curve. The crypto co-processor also implements the Elliptic Curve Fully Hashed Menezes-Qu-Vanstone (ECFHMQV) algorithm for generating session encryption keys. This algorithm is an authenticated key exchange protocol for generating shared 128-bit or 256-bit session keys for different data security requirements. EDAS employs these session keys to encrypt messages sent to the secondary observer (EDAS Computer) using the Advanced Encryption Standard (AES) algorithm. The resulting secure channel may then be used to transmit the ECDSA public key used for verifying data authenticity to the EDAS computer. Furthermore, the coprocessor contains a true random number generator (RNG) implemented in hardware. In an embodiment, the RNG may satisfy all statistical tests outlined in United States National institute of Standards and Technology (NIST) SP 800-22. This hardware RNG generates entropy automatically and continuously from small timing fluctuations between crypto co-processor digital circuits that are then multiplied into larger and larger differences.

Figure 3A:
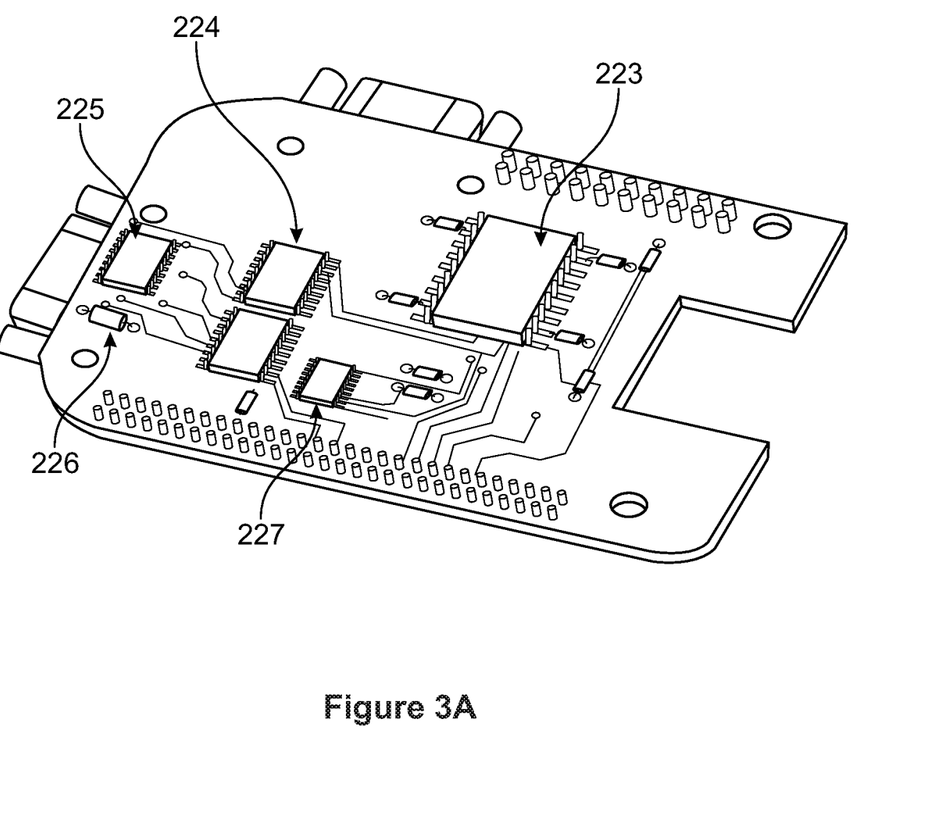
FIG. 3A shows a bottom view of a cape circuit board electronics according to an embodiment of the disclosure.

FIG. 3A shows a bottom view of the cape 210 shown in FIG. 3 according to an embodiment of the disclosure. As can be seen in FIG. 3A, the cape 210 further includes an isolated power unit 223, an isolated data unit 224, data transceivers 225, resistive couplings 226 and a real-time clock (RTC) unit 227. The isolated power unit 223 provides regulated, isolated power to the junction box using magnetic induction and chip scale transformers. The isolated data unit 224 employs both magnetic and capacitive isolation, which allow changes in main communication path signal lines to be captured but prevents direct current flow. By not allowing direct current flow, the isolation electronics will not degrade or alter the main communication path signal.

The data transceivers 225 convert RS-232-compatible signal levels to CMOS-compatible signal levels to pass to the processor board 220. RS-232 defines a '0' as +3V to +15V and a '1' as −3V to −15V. 225 also provides ±15 kV of electro-static discharge (ESD) protection. This protection is important as the junction box is wired to the external connectors where the main communication path may be repeatedly plugged and unplugged, which will generate ESD events that could damage the electronics. Additionally, the transceivers contain an INVALID output that indicates whether valid RS-232 signals are present. The absence of valid RS-232 signals can be used to detect main communication path cable disconnect, which may detect an intentional bypass of the main communication path from the junction box. Lastly, additional transceivers were placed on all unused handshaking/control lines of the main communication path. 225 brings these signals to the processor board so that any level transitions can be detected. Such level transitions may confer a security benefit by signifying that an adversary is using unused wires to bypass EDAS' primary monitoring.

The resistive couplings 226 are thermally resistive coupling elements, which are the transfer medium of signal energy (i.e., the branching mechanism) from the main communication path to the EDAS junction box. In addition to coupling, they provide additional defense against the EDAS injecting data onto the main communication path. Should the Junction Box fail, these elements limit the undesirable transfer of energy from the EDAS junction box to a level that will not interfere with signal levels on the main communication path.

The RTC 227 is a real-time clock to keep extremely accurate time across an industrial temperature range.

Referring again to FIG. 3, the processor board 220 interfaces with the cape 210 and runs or executes software to packetize, timestamp, digitally sign, encrypt, and transmit the data packets to the secondary observer system over the EDAS communications branch. The processor board 220 includes a power connection 221 and an EDAS branch connection 222. The power connection 221 provides a link for receiving power for the processor board 220 and cape 210. In another embodiment, power may be provided via power-over-USB or power-over-Ethernet connection.

The EDAS branch connection 222 transmits the branched signal to the secondary observer 112 (see FIG. 1). In this embodiment, the EDAS branch connection 222 is an Ethernet connection. In an embodiment, the EDAS branch connection may be an Ethernet-over-USB connection. In yet other embodiments, the EDAS branch connection 222 may be, but is not limited to, a fiber optic connection, a Wi-Fi or other wireless connection, or a coaxial connection.

The processor board 220 further includes a general-purpose processor 242, RAM (random access memory) 244, and flash memory 246 that stores the operating system and the software. An operating system run on the processor 242 may have functions removed not related to EDAS, but include operating system services to ensure that core EDAS software functions are operating correctly. The flash memory 246 also stores and executes software that may form and cryptographically secure brandied data packets, check for tamper of the EDAS junction box enclosure, monitor unused conductors in the main communications path, and check for cable disconnects on the main communication path.

In this exemplary embodiment, the processor board 220 is a single printed circuit board. In other embodiments, the processor board 220 may include one or more printed circuit boards. In other embodiments, the electronics package 203 may be embedded into one or more printed circuit boards. It should be understood that the electronic components and arrangement upon the cape 210 and processor board 220 are intended to be exemplary and not limiting to the disclosure, as the electrical components can be arranged in various configurations to provide the functionality of the cape 210 and processor board 220. For example, the various electrical components may be arranged on one or more printed circuit boards rather than limited to a single printed circuit board.

In an embodiment, the processor board 220 may be a commercial "BeagleBone Black" or "BeagleBone Green" embedded ARM processor board built by Texas Instruments. In another embodiment, the processor board 220 may be a commercial "Raspberry Pi" embedded ARM processor board built by the Raspberry Pi Foundation.

The electronics package 203 includes hardware, software, and firmware that forms packets from the branched data, checks for tamper of the EDAS junction box, monitors unused conductors in the main communications path, and checks for cable disconnects on the main communication path. The software that forms packets from branched data works as follows: it collects and buffers all data transferred over the main communication path, compiles the data into discrete packets; timestamps the packets; digitally signs the packets using an elliptic curve digital signature algorithm (ECDSA) algorithm; encrypts the packets using the Advanced Encryption Standard (AES) algorithm; and finally pushes them over a transmission control protocol (TCP) connection to the EDAS computer under the control of the secondary observer. The electronics package 203 branches both the "transmit" and "receive" signals in the RS 232/RS 485 specification of the main communication path. In another embodiment, some or all of the electronics package 203 functions may be integrated into an Application Specific Integrated Circuit (ASIC).

Figure 4:
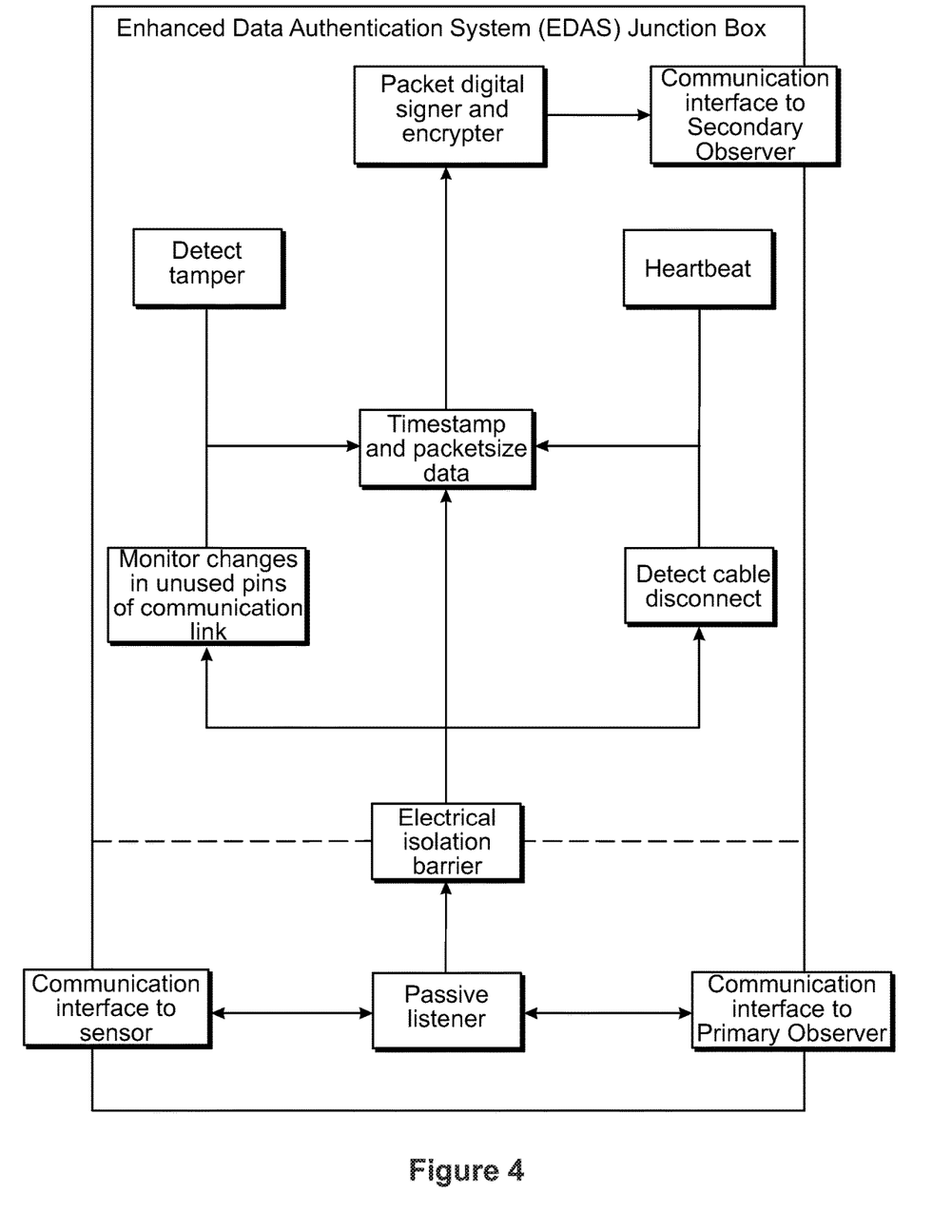
FIG. 4 illustrates the major EDAS junction box block functions according to an embodiment of the disclosure.

FIG. 4 is a schematic that generally shows the flow of data within the EDAS junction box according to the exemplary embodiment of the disclosure. As can be seen in FIG. 4, the EDAS junction box passively branches data from the main communication path via the thermally resistive coupling elements (below the dotted line). The branched data is passed through the electrical isolation barrier to the EDAS software (above the dotted line). The EDAS cape may also detect and report EDAS junction box tamper scenarios, main communication path cable disconnections, and/or monitor changes in unused communications links or paths in the main communications path. The software also periodically creates "heartbeat" messages to confirm that EDAS is operating normally. For all the above scenarios, the EDAS junction box software packetizes, timestamps, digitally signs, and encrypts these data before transmitting it to a secondary observer.

The EDAS junction box has no a priori understanding of (or expectation for) the data it branches from the main communication path. It must branch data streams that could appear in relatively short bursts (the triggering of a bar code reader, for example), or that run continuously (e.g., the output of a laser scanning rangefinder). In the first case, the ideal situation would be to keep all of the functionally-related data together in the same packet. In the second case, the stream would have to be split up into contiguous blocks (individually digitally signed and encrypted) that could be reassembled in a later post-processing step. To accommodate these extremes of data transfer scenarios, EDAS uses configurable size and time "limits" in constructing data packets.

Figure 5:
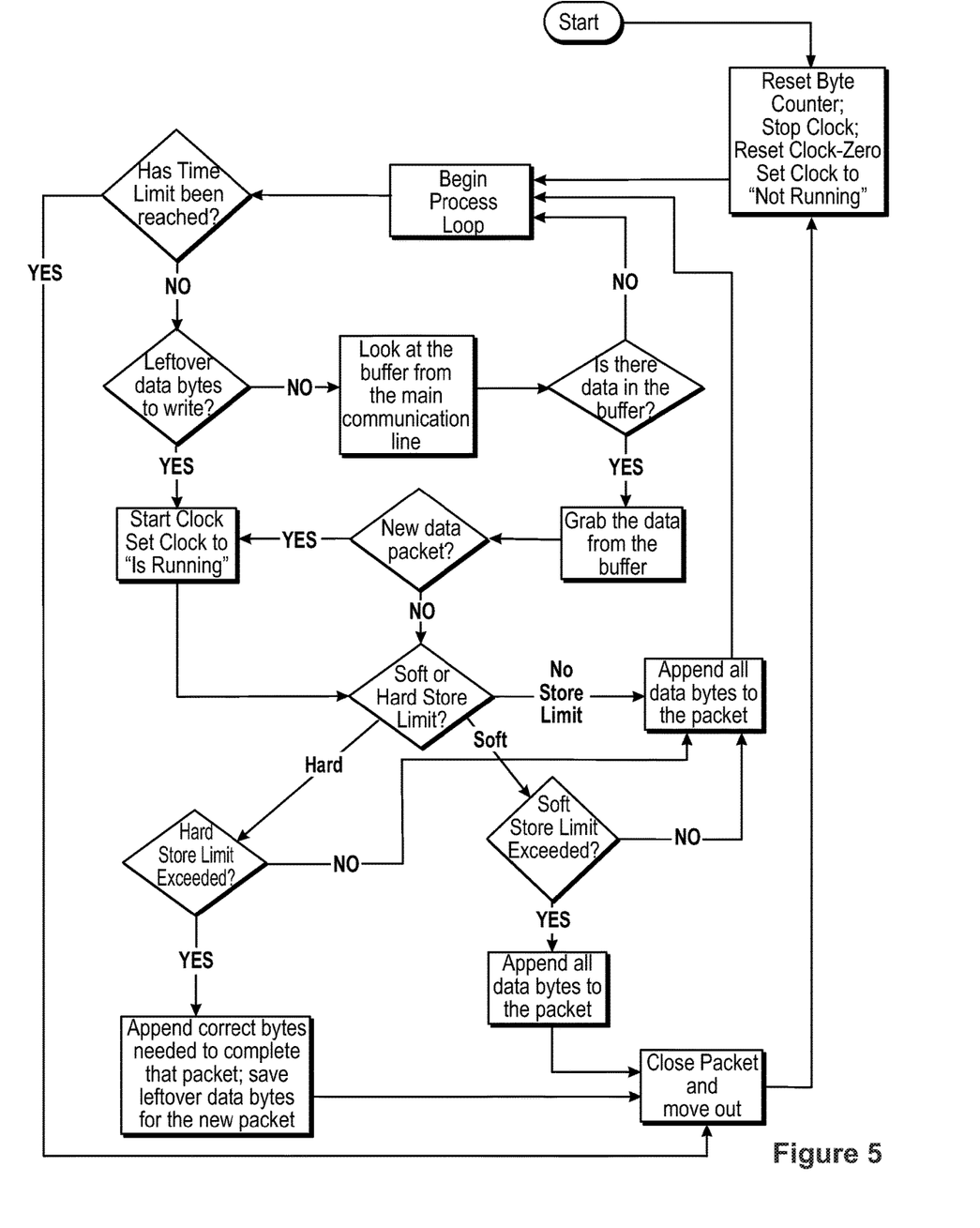
FIG. 5 illustrates EDAS software logic used in forming data packets according to an embodiment of the disclosure.

The EDAS packet builder works with both size and time limits; the logic is described in the following paragraphs and illustrated in FIG. 5. FIG. 5 illustrates EDAS logic used in forming data packets according to an embodiment of the disclosure. The size limit of the packet can be set as either "hard" or "soft." A hard limit defines a maximum data packet size, in number of bytes. As soon as enough data bytes have accumulated to reach the hard limit, EDAS creates the data packet, resets the size counter to zero, and will begin a new data packet with the next received data byte. A soft limit defines a minimum data packet size, in number of bytes. Once enough data bytes have accumulated to reach the soft limit, EDAS continues to accumulate data until it senses a time break in the data stream. At that point, EDAS creates the data packet, resets the size counter to zero, and will begin a new data packet with the next data byte. In either case—hard or soft size limit—the data packet is also subject to a time limit.

The time limit is always a "hard" limit; it is how long EDAS will accumulate data for a single packet. The first byte of data for a new data packet starts a clock. If that clock reaches the time limit before the size limit is reached (hard or soft), then EDAS creates the data packet, resets the size counter to zero, and will begin a new data packet with the next received data byte.

In an embodiment, the EDAS Branch communication link between the EDAS junction box and EDAS computer may suffer from network connectivity issues and cable disconnects. To minimize the effects of such disruptions, the junction box will continue to branch and packetize data, and store these packets in a size-configurable circular data buffer queue. Upon reestablishing the EDAS branch connection, the queued packets will be immediately transmitted to the EDAS computer.

EDAS uses cryptographic authentication and encryption on all data transferred over the TCP network connection. All packets generated by the EDAS Junction Box are digitally signed and encrypted. Similarly, all packets received by the EDAS Computer are decrypted and authenticated. In an embodiment, all cryptographic operations on the EDAS Computer are computed in software using BouncyCastle, an open source third-party software library. In other embodiments, other cryptographic algorithms, software, and/or hardware may be used.

"EDAS server" software operates on the EDAS Computer; it connects with the software on the EDAS Junction Box (which runs the "EDAS client" software) by opening a TCP connection and then awaits data packets. When the EDAS junction box pushes data packets to the EDAS Computer, the server software decrypts the data packet, authenticates the digital signature, and writes the data to a text file using ASCII encoding. Each data packet is appended as a single line of comma-separated values (CSV) in the text file. An example of corresponding fields for each data value are listed in Table 1.

TABLE 1

Contents of each line in the EDAS Output File

| Field | Description |
| --- | --- |
| Received Date/Time | Date and time -according to the operating system clock on the EDAS Computer-specifying when the data packet was received from the EDAS Junction Box |
| Message Type | An enumerated type meaning:<br>"DATA" for branched packets,<br>"HEARTBEAT" for heartbeat messages,<br>"ENCRYPTION_FAILURE" for decryption failure of received packet,<br>"TAMPER" for case, under/over voltage, or under/over temperature tamper,<br>"SERIAL" for main communication path cable disconnect,<br>"GPIO_PIN_LEVEL_CHANGE" for other main communication path conductor level changes,<br>"WARN" for junction box errors that should be brought to the attention of the secondary observer |
| Message ID | A unique message number assigned to the data packet. This value monotonically increases by one for each new packet. |
| EDAS ID | A unique non-negative ID number assigned to each EDAS Junction Box so that its data may be identified in the EDAS Output File. |
| EDAS Date/Time | Date and time*-according to the clock on the EDAS Junction Box-specifying when the EDAS Junction Box created the data packet |
| Data Source | An enumerated type meaning:<br>"operator equipment" for data (or cable disconnect) |

TABLE 1-continued

Contents of each line in the EDAS Output File

| Field | Description |
|---|---|
| | coming FROM the sensor |
| | "operator computer" for data (or cable disconnect) going TO the sensor |
| | "tamper" for a case, under/over voltage, under/over temperature tamper |
| | "none" for other message types |
| Data Size | The number of bytes in the data field |
| Data | ASCII text representation of the data branched from the main communication path |
| Digital Signature | A sequence of bytes appended to the packet representing the digital signature. |
| Authentication Status | Either: "Passed", or Reason for failure |
| Encryption Status | Either: "Success" for all data and junction box control messages, or "Failure" for all encryption failure messages |

*Note: Date and time are represented in the format YYYY-MM-DD hh:mm:ss, where YYYY=year, MM=month, DD=day, hh=hour (24-hour clock), mm=minute, and ss=second. All data timestamps are represented in a universal time zone format, such as UTC.

In an embodiment, the EDAS server software will connect to and accept data from multiple EDAS junction boxes simultaneously. The data from the various junction boxes will be interleaved into the EDAS output file but can be distinguished by the unique junction box "EDAS ID" number.

Figure 6:
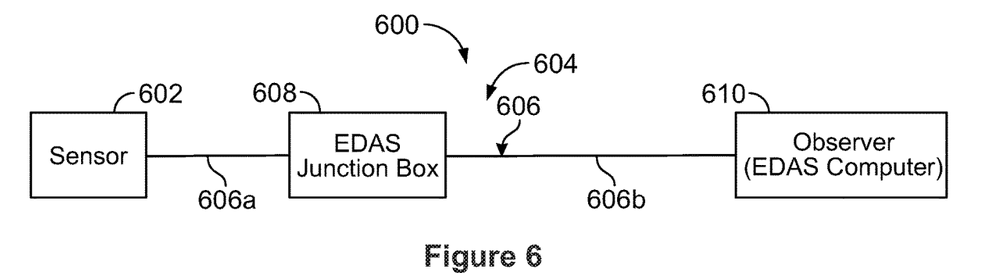
FIG. 6 illustrates a data monitoring system according to another embodiment of the disclosure.

FIG. 6 illustrates a monitored system 600 according to another embodiment of the disclosure. As can be seen in FIG. 6, the monitored data system 600 includes a sensor 602 and an EDAS system 604. The monitored data system 600 may also be referred to as an EDAS monitored data system.

In this exemplary embodiment, the data source is the sensor 602, however, in other embodiments, the data source may be another information system as discussed above in earlier embodiments. The sensor data output, the original information system data, is communicated to the EDAS system 604 via a communication pathway 606. The communication pathway 606 includes a first portion 606a that connects the information system 602 to the EDAS junction box 608 and a second portion 606b that connects the EDAS junction box 608 to an EDAS observer 610. The data output may be a communication path connection with a data stream of the information system or other source of information data, such as, but not limited to a sensor, computer, or database. In other embodiments, the information system 602 may be a measurement system (e.g., parameter measurement, such as, but not limited to temperature, pressure or radiation measurement), a transaction-based system (e.g., monitoring banking transactions or stock trades), an intelligence gathering system (e.g., intercepted communication streams), legacy systems, and other systems where information is gathered, monitored, transmitted or stored.

The EDAS system 604 includes the communication path 606, an EDAS junction box 608, and an EDAS observer 610. The communication path 606 may be referred to as a EDAS communication pathway The main EDAS junction box 608 is connected to the information system 602 via the communication pathway 606a. In this exemplary embodiment, the communication path 606a connects to the junction box via a standardized DB-9 serial connector. The information from the communication path 606a flows to the EDAS junction box 608 and further on to the EDAS observer 610 via the EDAS branch 606b. The EDAS junction box 608 may be the same as described above in the earlier embodiment, but with the EDAS branch connection routed to an observer, which may be the operator/owner of the information system 602. As opposed to the embodiment above, this embodiment does not branch data to a secondary observer. The EDAS system 604 may be initially integrated into or added later to the information system 602.

In this embodiment, the EDAS system 604 may be used to cryptographically secure the data from an unsecured information system such as, but not limited to a monitoring or measurement system (e.g., to protect unsecured legacy instrumentation data in a nuclear facility). Such a measurement system may be custom made or no longer supported by the original equipment manufacturer, and to replace or modify it would incur great expense. Securing the data protects critical information that would cause financial or regulatory harm to the facility operator should the data be corrupted, manipulated, or viewed by a competitor.

In this embodiment, EDAS does not branch the communication path 606, but cryptographically secures it so the data is confidential and authentic. All of the same components described in the electronics package 203 are still used in this embodiment. Note that it is still required to convert the main communication path 606a signal levels (e.g., RS-232-compatible signal levels) to CMOS-compatible signal levels to pass to the processor board. Isolation electronics serve to provide regulated, isolated power to the junction box and ensure no metadata inadvertently transmits to the information system 602, which could cause unexpected behaviors. As in other embodiments, the data from 606a is packetized, digitally signed, encrypted, and transmitted to the observer (EDAS Computer) 610.

As the EDAS junction box 608 transmits data packets to the EDAS Computer 610, the server software decrypts the data packet, authenticates the digital signature, and writes the data to a text file using ASCII encoding. The server software functions identically to other previously-described embodiments.

According to another embodiment of the disclosure, a method of authenticating data via the integration of a sensor and EDAS components is disclosed. The method includes using EDAS to create a secure copy of data provided to a primary observer and comparing the primary user's data against the secondary observer's secure copy of data (see FIG. 1). This concept, as with the prior embodiments can be extended to multiple observers.

Figure 7:
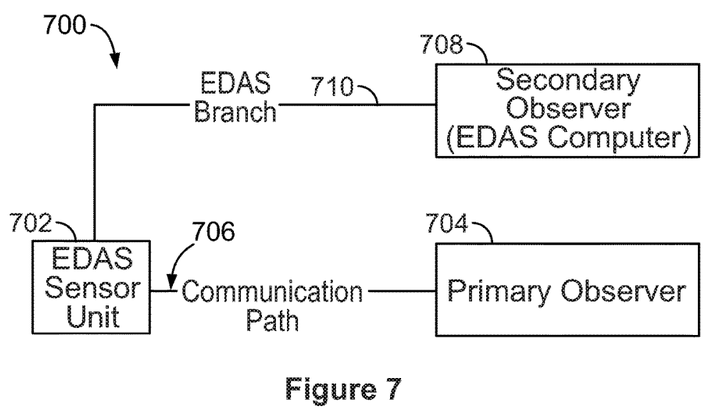
FIG. 7 illustrates a data measurement system according to an embodiment of the disclosure.

FIG. 7 illustrates a monitored measurement system 700 according to an embodiment of the invention. The monitored measurement system 700 includes an EDAS sensor unit 702, a primary observer 704, a communication path 706 connecting the EDAS sensor unit 702 and the primary observer 704, a secondary observer 708 and an EDAS communication branch 710 connecting the EDAS sensor unit 702 and the secondary observer 708. The EDAS sensor unit 702 provides probe or sensor data to the primary observer 704 and a secure copy of that data to the secondary observer 708. The primary observer 704, secondary observer 708, communication path 706 and EDAS communication branch (EDAS branch) 710 are analogous to the systems and methods that describe the monitored measurement system 103 shown in FIG. 1 and described in the text supporting FIG. 1. The EDAS sensor unit 702 is analogous to combining the EDAS Junction Box 108 and sensor 102 of FIG. 1.

Figure 8:
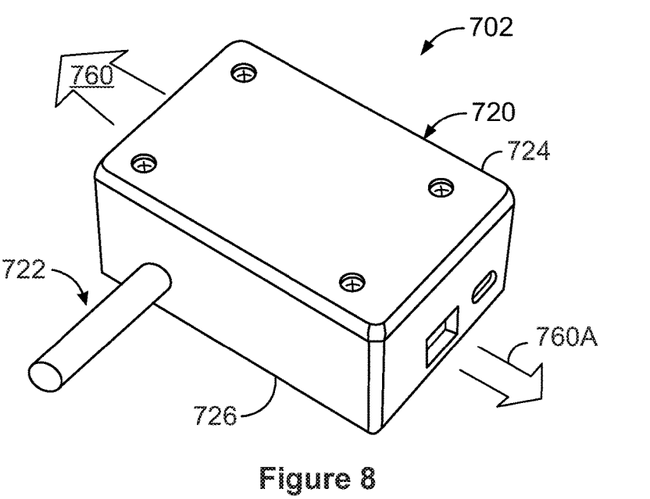
FIG. 8 shows an EDAS sensor system according to another embodiment of the disclosure.
Figure 9:
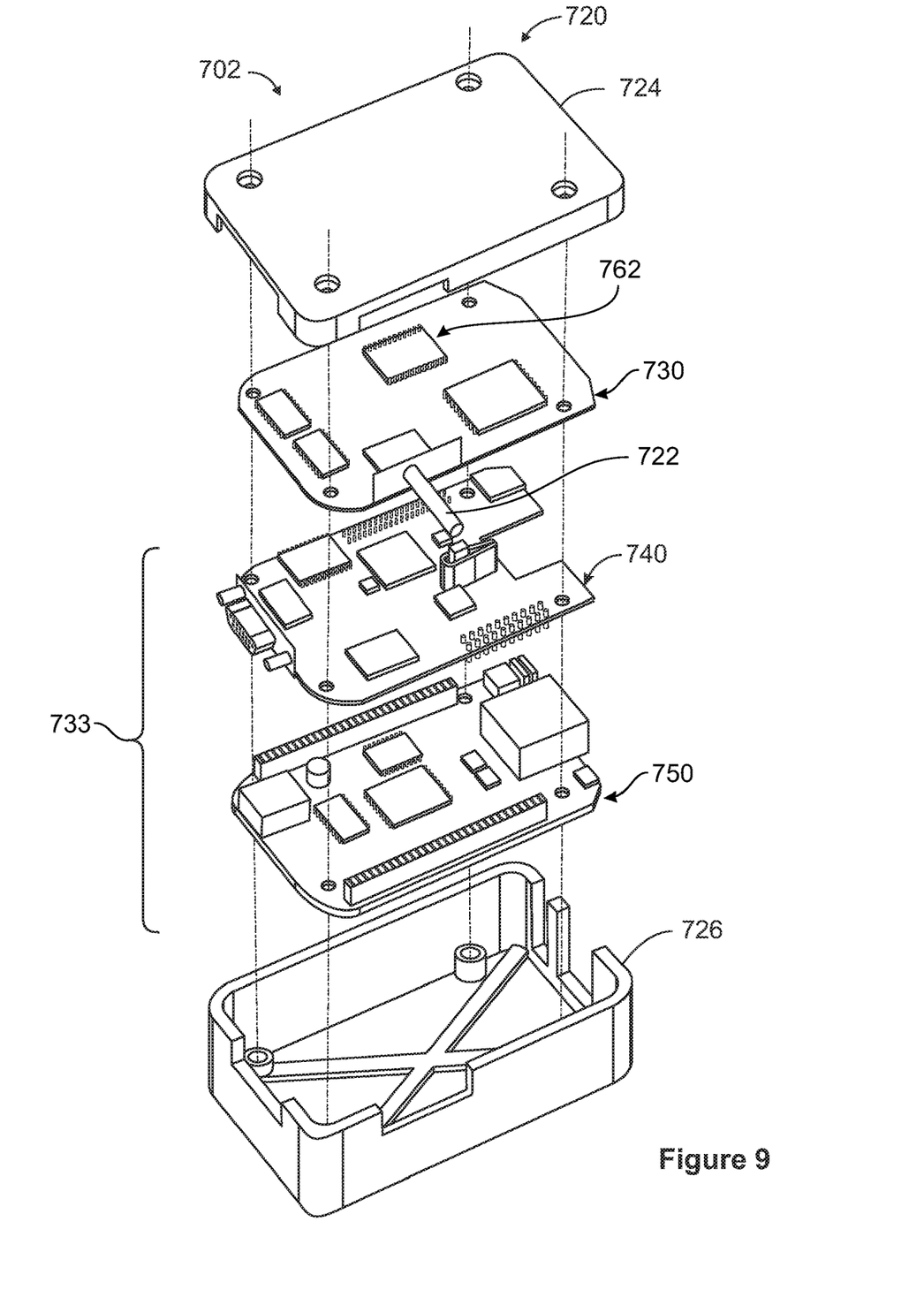
FIG. 9 shows an exploded view of the EDAS sensor system of FIG. 8 with the fasteners removed for clarity.

FIGS. 8 and 9 illustrate an embodiment of an EDAS sensor unit 702 according to an embodiment of the disclosure. As can be seen in FIGS. 8 and 9, the EDAS sensor unit 702 includes a housing 720 having a top portion 724 and a bottom portion 726 and a probe or sensor 722. In this exemplary embodiment, the sensor 722 measures temperature. In other embodiments, the sensor 722 may measure a parameter, such as, but not limited to radiation, temperature, pressure, or other parameters as analogously disclosed for sensor 102 above.

The EDAS sensor unit 702 transmits the parameter data (data) 760 measured by the sensor 722 to the primary observer (FIG. 7). The EDAS sensor unit 702 also copies data measured by the sensor 722 without accidentally or intentionally manipulating the data 760 and provides a cryptographically secure copy of the data 760A to the secondary observer 708 (FIG. 7). The secure copy of the data 760A, which includes data 760 along with appended metadata (see Table 1 for metadata fields), is transmitted along the EDAS branch 710.

Referring to FIG. 9, in addition to the housing 720, the EDAS sensor unit 702 includes a sensor board 730 and an electronics package 733. The sensor board 730 includes the sensor probe 722 and electronics 762 to capture and process a parameter sensed by the probe 722 and convert it into digital data processed by the electronics package 733. The electronics package 733 includes an EDAS circuit board or cape 740 and a processor board 750. The cape 740 and processor board 750 provide analogous functions as those described above in discussing cape 210 and processor board 220.

In this exemplary embodiment, the cape 740, processor board 750 and sensor board 730 are individual printed circuit boards. In other embodiments, the boards may include one or more printed circuit boards. In other embodiments, the electronics package 733 may be embedded into one or more printed circuit boards. It should be noted that the electronic components and arrangement upon the boards is intended to be exemplary and not limiting to the disclosure, as the electrical components can be arranged in various configurations to provide the functionality of the cape 740, processor board 750 and sensor board 730. For example, the various electrical components may be arranged on one or more printed circuit boards rather than limited to a single printed circuit board.

As the EDAS sensor unit 702 transmits data packets to the secondary observer 708, the server software decrypts the data packet, authenticates the digital signature, and writes the data to a text file using ASCII encoding. The server software functions identically to other previously-described embodiments.

The monitored measurement system 700 allows for the combination of a sensor and EDAS components into an integrated package (EDAS sensor unit 702). In this embodiment, the integrated EDAS sensor unit 702 provides confidence to a secondary observer that it would be difficult for an adversary to manipulate the sensor signal. As opposed to the embodiment in Figure there is now no need to protect the data between the sensor and junction box tap-off point, eliminating the need to combine EDAS with other monitoring methods, such as surveillance or tamper indicating cabling. Sensor manufacturers could design EDAS components directly into their sensor systems so that the EDAS functionality can be included as part of the original equipment warranty. Additionally, a tamper indicating housing for the EDAS sensor unit 702 can provide visible evidence and/or the creation of an electronic alert message to the secondary observer in the case of tamper. This embodiment is intended for use in cooperative monitoring environments, such as, but not limited to, safeguarded nuclear facilities where a facility operator and safeguards inspectorate both have an interest in the data sent from a sensor. As such, the data sent to the inspector is cryptographically secure to provide the inspector confidence that the data is authentic for nuclear material accountancy purposes as well as monitoring for evidence of undeclared facility activities. Securing the data further protects critical information that would cause financial or regulatory harm to the facility operator should the data be corrupted, manipulated, or viewed by a competitor. The EDAS components guarantee that no signal from the branched inspector side can accidentally or intentionally leak onto the operator communication path and manipulate the data. Another advantage of this embodiment is that a junction box is not installed at a tap-off point, which is less disruptive and intrusive to the facility operations and systems.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A system, comprising:
an information system;
a junction box connected to the information system;
a primary observer connected to the junction box, the primary observer receiving data from the information system;
a secondary observer connected to the junction box;
wherein the junction box comprises:
a secondary observer side that comprises hardware, firmware, and software that monitors and copies the data to form a data copy, cryptographically secures the data copy, and securely transmits the data copy to the secondary observer; and
wherein the data is copied and transmitted to the secondary observer without manipulation of the data; and
wherein the secondary observer is electrically isolated from the primary observer;
wherein the data is galvanically isolated from the data copy where the data copy is copied from the data.

2. The system of claim 1, wherein the information system is a measurement system.

3. The system of claim 2, wherein the measurement system includes a sensor and the data comprises sensor data.

4. The system of claim 1, wherein the information system is selected from a group consisting of a sensor, a computer, a data network, a database, and a social media network.

5. A system, comprising:
an information system;
a junction box connected to the information system; and
an observer connected to the junction box;

wherein the junction box comprises:
an observer side comprising hardware, firmware, and software that monitors, copies and cryptographically secures the data to form a secure data copy, and transmits the secure data copy to the observer; and
wherein the data is copied and transmitted to the observer without manipulation of the data;
wherein the data is galvanically isolated from the secure data copy where the secure data copy is copied from the data.

6. The system of claim 5, wherein the data is galvanically isolated from the secure data copy.

7. The system of claim 5, wherein the information system is a measurement system.

8. The system of claim 7, wherein the measurement system includes a sensor and the data comprises sensor data.

9. The system of claim 5, wherein the information system is selected from a group consisting of a sensor, a computer, a data network, a database, and a social media network.

10. A method, comprising:
providing a data stream comprising data to a primary observer;
creating a branched data stream comprising cryptographically secure data from the data stream;
wherein the branched data stream is created without manipulation of the data stream; and
providing the branched data stream to a secondary observer; and
wherein the branched data stream is electrically isolated from the data stream;
wherein the branched data stream is galvanically isolated from the data stream where the branched data stream is created from the data stream.

11. The method of claim 10, wherein the cryptographically secure data is galvanically isolated from the data.

12. The method of claim 10, wherein the data stream is from a measurement system.

13. The method of claim 12, wherein the measurement system includes a sensor and the data comprises sensor data.

14. The method of claim 10, wherein the data stream is from an information system selected from a group consisting of a sensor, a computer, a data network, a database, and a social media network.

15. The method of claim 10, wherein the data stream is an existing data stream and the branched data stream is branched from the existing data stream after the initial operation of the data stream.

16. The method of claim 10, further comprising comparing the secure data to the data and determining if the data has been altered.

17. A method, comprising:
creating a cryptographically secure data stream from a data stream without manipulation of data stream data; and
transmitting the cryptographically secure data stream to an observer;
wherein the cryptographically secure data stream is electrically isolated from the data stream.

18. The method of 17, wherein the cryptographically secure data stream is galvanically isolated from the data stream.

19. The method of claim 17, wherein the data stream is from a measurement system.

20. The method of claim 19, wherein the measurement system includes a sensor and the data stream comprises sensor data.

21. The method of claim 17, wherein the data stream is from an information system selected from a group consisting of a sensor, a computer, a data network, a database, and a social media network.

22. A data routing device, comprising:
a data input for receiving data from an information system;
a data output for outputting the data to a primary observer; and
a second data output for transmitting a secure copy of the data to a secondary observer;
wherein the data routing device further comprises a secondary observer side comprising hardware, firmware, and software that monitors the data, copies the data, cryptographically secures the data copy to form the secure copy of the data, and transmits the secure copy of the data from the data routing device to the secondary observer; and
wherein the data is copied to form the secure copy of the data without manipulation of the data; and
wherein the secondary observer is electrically isolated from the primary observer;
wherein the secure copy of the data is galvanically isolated from the data where the secure copy of the data is copied from the data.

23. The data routing device of claim 22, wherein the hardware provides galvanic isolation between the data and the secure copy of the data.

24. The data routing device of claim 22, wherein in the hardware comprises circuits configured to ensure that no secure copy of the data can leak from the secondary observer side of the data routing device onto the data.

25. The data routing device of claim 23, wherein the hardware that provides galvanic isolation including both magnetic and capacitive isolation.

26. The data routing device of claim 22, wherein the hardware, firmware, and software comprises a processor that packetizes, timestamps, digitally signs, encrypts, and transmits the secure copy of the data to the secondary observer.

27. The data routing device of claim of 24, wherein the circuits comprise resistive coupling elements.

28. A data routing device, comprising:
a data input for receiving data from an information system;
a data output for outputting a secure copy of the data to an observer; and
wherein the data routing device further comprises an observer side comprising hardware, firmware, and software that monitors the data, copies the data, cryptographically secures the data copy to form a secure copy of the data, and transmits the secure copy of the data from the data routing device to the observer; and
wherein the data is copied to form the secure copy of the data without manipulation of the data; and
wherein the observer is electrically isolated from the data output;
wherein the data is galvanically isolated from the data copy where the data copy is copied from the data.

29. The data routing device of claim 28, wherein the hardware provides galvanic isolation between the data and the secure copy of the data.

30. The data routing device of claim 29, wherein the hardware that provides galvanic isolation includes both magnetic and capacitive isolation.

31. The data routing device of claim 28, wherein in the hardware comprises circuits configured to ensure that no secure copy of the data can leak from the observer side of the data routing device onto the data.

32. The data routing device of claim of 31, wherein the circuits comprise resistive coupling elements.

33. The data routing device of claim 28, wherein the hardware, firmware, and software comprises a processor that packetizes, timestamps, digitally signs, encrypts, and transmits the secure copy of the data to the observer.

34. A monitored measurement system, comprising:
 a system having a parameter;
 a sensor unit connected to the system for measuring the parameter;
 a primary observer connected to the sensor unit;
 a secondary observer connected to the sensor unit;
 wherein the sensor unit comprises:
  a sensor package for measuring the parameter, creating data representing the measured parameter, and transmitting the data to the primary observer; and
  a secondary observer side of the sensor unit comprising hardware, firmware, and software that monitors and copies the data to form a data copy, cryptographically secures the data copy, and securely transmits the data copy to the secondary observer;
  wherein the data is copied and transmitted to the secondary observer without manipulation of the data; and
  wherein the secondary observer is electrically isolated from the primary observer;
  wherein the data copy is galvanically isolated from the data where the data copy is copied from the data.

35. The monitored measurement system of claim 34, wherein the data is galvanically isolated from the secure data copy.

36. The monitored measurement system of claim 34, wherein the parameter is selected from a group consisting of radiation detection alert, radiation level, imagery, temperature, weight, pressure, proximity, and light.

37. The monitored measurement system of claim 34, wherein the hardware provides galvanic isolation between the data and the secure data copy.

38. The monitored measurement system of claim 37, wherein the hardware and firmware that provides galvanic isolation including both magnetic and capacitive isolation.

39. The monitored measurement system of claim 34, wherein in the hardware comprises circuits configured to ensure that no secure data can leak from the secondary observer side of the sensor unit onto the data.

40. The monitored measurement system of claim of 39, wherein the circuits comprise resistive coupling elements.

41. The monitored measurement system of claim 34, wherein the hardware, firmware, and software comprises a processor that packetizes, timestamps, digitally signs, encrypts, and transmits the secure data copy to the secondary observer.

42. A method of monitoring a measurement system comprising:
 inserting a sensor unit into a system for measuring a parameter of the system;
 connecting a primary observer connected to the sensor unit;
 connecting a secondary observer connected to the sensor unit;
 wherein the sensor unit comprises:
  a sensor package for measuring the parameter, creating data representing the measured parameter, and transmitting the data to the primary observer; and
  a secondary observer side of the sensor unit comprising hardware, firmware, and software that monitors and copies the data to form a data copy, cryptographically secures the data copy, and securely transmits the data copy to the secondary observer;
  wherein the data is copied and transmitted to the secondary observer without manipulation of the data; and
  wherein the secondary observer is electrically isolated from the primary observer;
  wherein the data is galvanically isolated from the data copy where the data copy is copied from the data.

43. The method of claim 42, wherein the data is galvanically isolated from the data copy.

44. The method of claim 42, wherein the parameter is selected from a group consisting of radiation detection alert, radiation level, imagery, temperature, weight, pressure, proximity, and light.

45. The method of claim 42, wherein the hardware provides galvanic isolation between the data and the secure data copy.

46. The method of claim 45, wherein the hardware that provides galvanic isolation including both magnetic and capacitive isolation.

47. The method of claim 42, wherein in the hardware comprises circuits configured to ensure that no secure data can leak from the secondary observer side of the sensor unit onto the data.

48. The method of claim of 47, wherein the circuits comprise resistive coupling elements.

49. The method of claim 42, wherein the hardware, firmware, and software comprises a processor that packetizes, timestamps, digitally signs, encrypts, and transmits the secure data copy to the secondary observer.

50. A sensor unit, comprising:
 a sensor package for measuring a parameter, creating data representing the parameter, and transmitting the data to the primary observer;
 a first output for providing the data to a primary observer;
 a second output for providing a secure data copy to a secondary observer; and
 a secondary observer side of the sensor unit comprising hardware, firmware, and software that monitors and copies the data to form the data copy, cryptographically secures the data copy to form the secure data copy, and transmits the secure data copy to the secondary observer;
 wherein the data is copied and transmitted to the secondary observer without manipulation of the data; and
 wherein the secondary observer is electrically isolated from the primary observer;
 wherein the data is galvanically isolated from the secure data copy where the secure data copy is copied from the data.

51. The sensor unit of claim 50, wherein the data is galvanically isolated from the secure data copy.

52. The sensor unit of claim 50, wherein the sensor package comprises a sensor for measuring a parameter selected from a group consisting of radiation detection alert, radiation level, imagery, temperature, weight, pressure, proximity, and light.

53. The sensor unit of claim 50, wherein the hardware provides galvanic isolation between the data and the secure data copy.

54. The sensor unit of claim 53, wherein the hardware that provides galvanic isolation including both magnetic and capacitive isolation.

55. The sensor unit of claim 50, wherein in the hardware comprises circuits configured to ensure that no secure data can leak from the secondary observer side of the sensor unit onto the data.

56. The sensor unit of claim of 55, wherein the circuits comprise resistive coupling elements.

57. The sensor unit of claim 50, wherein the hardware, firmware, and software comprises a processor that packetizes, timestamps, digitally signs, encrypts, and transmits the secure data copy to the secondary observer.

* * * * *